United States Patent
Yoshioka

(10) Patent No.: US 9,776,351 B2
(45) Date of Patent: Oct. 3, 2017

(54) INJECTION MOLDING SYSTEM

(71) Applicant: FANUC Corporation, Yamanashi (JP)

(72) Inventor: Mitsushi Yoshioka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/099,677

(22) Filed: Apr. 15, 2016

(65) Prior Publication Data

US 2016/0311143 A1    Oct. 27, 2016

(30) Foreign Application Priority Data

Apr. 22, 2015   (JP) ................... 2015-087623

(51) Int. Cl.
 *B29C 45/42* (2006.01)
 *B29C 45/17* (2006.01)
 *B29C 45/84* (2006.01)

(52) U.S. Cl.
 CPC .......... *B29C 45/42* (2013.01); *B29C 45/1761* (2013.01); *B29C 45/84* (2013.01); *B29C 2045/4283* (2013.01)

(58) Field of Classification Search
 CPC ..... B29C 45/1761; B29C 45/42; B29C 45/84; B29C 2045/4283; B29C 45/03
 See application file for complete search history.

(56) References Cited

U.S. PATENT DOCUMENTS

| 5,413,454 A * | 5/1995 | Movsesian ............... B25J 9/046 294/100 |
| 5,553,198 A * | 9/1996 | Wang .................... A61B 34/70 606/19 |
| 6,296,472 B1 | 10/2001 | Ito et al. |
| 2008/0222883 A1* | 9/2008 | Ono ...................... B23P 21/004 29/787 |

FOREIGN PATENT DOCUMENTS

| JP | 62-150119 U | 9/1987 |
| JP | H06155519 A | 6/1994 |
| JP | H1095028 A | 4/1998 |
| JP | H190958 A | 4/1999 |

OTHER PUBLICATIONS

Office Action in JP Application No. 2015-087623, dated Jun. 6, 2017.

* cited by examiner

*Primary Examiner* — Joseph S Del Sole
*Assistant Examiner* — John Robitaille
(74) *Attorney, Agent, or Firm* — Hauptman Ham, LLP

(57) ABSTRACT

In an injection molding system, a rack on which a peripheral device can be mounted includes a fixing unit for removably fixing to a machine stool of an injection molding machine and a moving unit for making the rack movable alone. Accordingly, maintenance of the injection molding machine can be performed satisfactorily and positioning work is also made easier so that the rack can be transported easily.

10 Claims, 8 Drawing Sheets

INJECTION MOLDING SYSTEM

RELATED APPLICATIONS

The present application claims priority to Japanese Patent Application Number 2015-087623, filed Apr. 22, 2015, the disclosure of which is hereby incorporated by reference herein in its entirety.

BACKGROUND OF THE INVENTION

1. Field of the Invention

The present invention relates to an injection molding system, and in particular, relates to an injection molding system including an injection molding machine and a peripheral device.

2. Description of the Related Art

An injection molding machine includes a clamping device and an injection device opposite to each other and a mold is arranged in a mold clamping space. Then, a molded product is molded by injecting a resin molten inside a cylinder of the injection device into the mold and then clamping the mold. To perform molding work in the injection molding machine smoothly, in addition to work to mold a molded product, extraction of a molded product and a post process, work by a stocker that performs cooperative work with a device that extracts a molded product and the like, the supply of insert components for insert molding in which molding is performed by inserting insert components into the mold, and peripheral work such as parts feeding, gate cutting, antistatic cleaning, and product inspection need to be performed.

Conventionally, a peripheral device to perform such peripheral work is independently arranged on a floor of the factory or the like separately from the injection molding machine. To perform a set of injection molding machine work by linking the injection molding machine and the peripheral device, it is necessary to connect a cable between a control device of the injection molding machine and the peripheral device to exchange electric signals therebetween. When a temperature controller is used as a peripheral device, it is necessary to connect a hose or the like to allow a coolant to flow.

Thus, when the arrangement location of the injection molding machine is moved, it is necessary to remove the cable, hose and the like and to transport the injection molding machine and each peripheral device independently. After the transportation is completed, it is necessary to connect the cable, hose and the like and then to perform setup work of the peripheral device.

If the peripheral device is a robot for product extraction or the like that directly performs physical work on the injection molding machine or the mold, precise work needs to be performed and thus, it is necessary to always maintain the positional relationship between the injection molding machine and the peripheral device in an appropriate state. The stocker, insert component supply device, parts feeder, gate cutting device, charge neutralizer, and product inspection device are peripheral devices directly related to the injection molding machine and the robot for product extraction and thus, like the robot, precise positioning accuracy is required.

To maintain the positioning accuracy, the relative positional relationship between the injection molding machine and the peripheral device needs to be restored to the same state after transportation work and positioning work of both may become troublesome. If the positioning work does not go well, it is necessary to teach the robot and other peripheral devices to perform operations again. In addition, positional shifts may arise in the peripheral device such as a robot due to vibration of the injection molding machine. Therefore, it may become necessary to check the relative position between the injection molding machine and the peripheral device or to teach how to operate again not just when the arrangement location is transferred, but as daily maintenance work.

JP 10-95028 A discloses a technology according to which a rack including a mounting plate of peripheral devices is fixed to an injection molding machine and a robot and peripheral devices used together with the injection molding machine are mounted on the mounting plate. Then, the robot and peripheral devices used together with the injection molding machine are integrally mounted on the injection molding machine via the rack.

JP 11-90958 A discloses a technology according to which an empty box in which a molding finished product is packed by a packing robot, an empty box stocker that contains a molded product containing box, an empty box transport conveyor, and a molded product containing box transport conveyor are provided and the empty box conveyor, the molded product containing box transport conveyor, and the packing box are arranged above a clamping unit of an injection molding machine.

JP 6-155519 A discloses a technology according to which a robot whose main body is placed on rails and made movable on rails in reciprocating directions is used in combination with an injection molding machine.

According to the technology disclosed by JP 10-95028 A, the rack on which the robot and peripheral devices are placed is mounted on a base portion of the injection molding machine and thus, it is necessary to place and fix the rack to the base portion of the injection molding machine. Therefore, it takes a lot of time to mount the rack and sometimes, it is difficult to maintain a mechanism unit or to mount a safety fence.

The technology disclosed by JP 11-90958 A uses the top surface of the clamping unit of the injection molding machine to arrange the empty box transport conveyor, the molded product containing box conveyor, the packing robot and the like. However, the top surface of the clamping unit is arranged independently of the injection molding machine.

The technology disclosed by JP 6-155519 A discloses that an industrial robot is used for peripheral work of the injection molding machine. However, a stool on which the industrial robot is arranged is mounted on, like the technology disclosed in JP 10-95028 A, the base portion of the injection molding machine. Therefore, it takes a lot of time to mount the rack and sometimes, it is difficult to maintain a mechanism unit or to mount a safety fence.

SUMMARY OF THE INVENTION

An object of the present invention is to provide an injection molding system allowing a rack mounted on an injection molding machine to be easily mounted or removed.

An injection molding system according to the present invention is an injection molding system including an injection molding machine having a machine stool, a peripheral device, and a rack on which the peripheral device can be mounted, wherein the rack includes a fixing unit for removably fixing to the machine stool and a moving unit for making the rack movable alone.

Accordingly, maintenance of the injection molding machine can be performed satisfactorily. In addition, the positional relationship between the injection molding machine and the machine stool is fixed and thus, positioning work becomes easier and the rack can be transported easily.

The moving unit may be a roller or a wheel.

A mounting surface of the rack for the peripheral device may be above a clamping mechanism unit of the injection molding machine.

Accordingly, a space above the clamping mechanism unit of the injection molding machine, which is normally a dead space, can effectively be used.

The fixing unit may be included on a side face on a clamping unit side of the machine stool.

Accordingly, the rack can be fixed to the machine stool easily.

The peripheral device may be a molded product extraction device and a safety fence of the molded product extraction device may be provided on the rack.

In a conventional injection molding system, moving the rack is not easy and thus, the rack may be in the way when the mold is replaced. According to the present invention, the rack can be moved easily and so when, for example, the mold is replaced in the injection molding machine, the rack is out of the way.

The molded product extraction device may be a robot.

A slide mechanism that allows the safety fence to move may be included.

By making the safety fence movable by sliding, work by the injection molding machine can be performed satisfactorily without moving the rack.

According to the present invention, an injection molding system allowing a rack mounted on an injection molding machine to be easily mounted or removed can be provided.

BRIEF DESCRIPTION OF THE DRAWINGS

The above object and other objects of the present invention will be apparent from the description below with reference to appended drawings. Among these drawings.

DETAILED DESCRIPTION OF THE PREFERRED EMBODIMENTS

Figure 1:
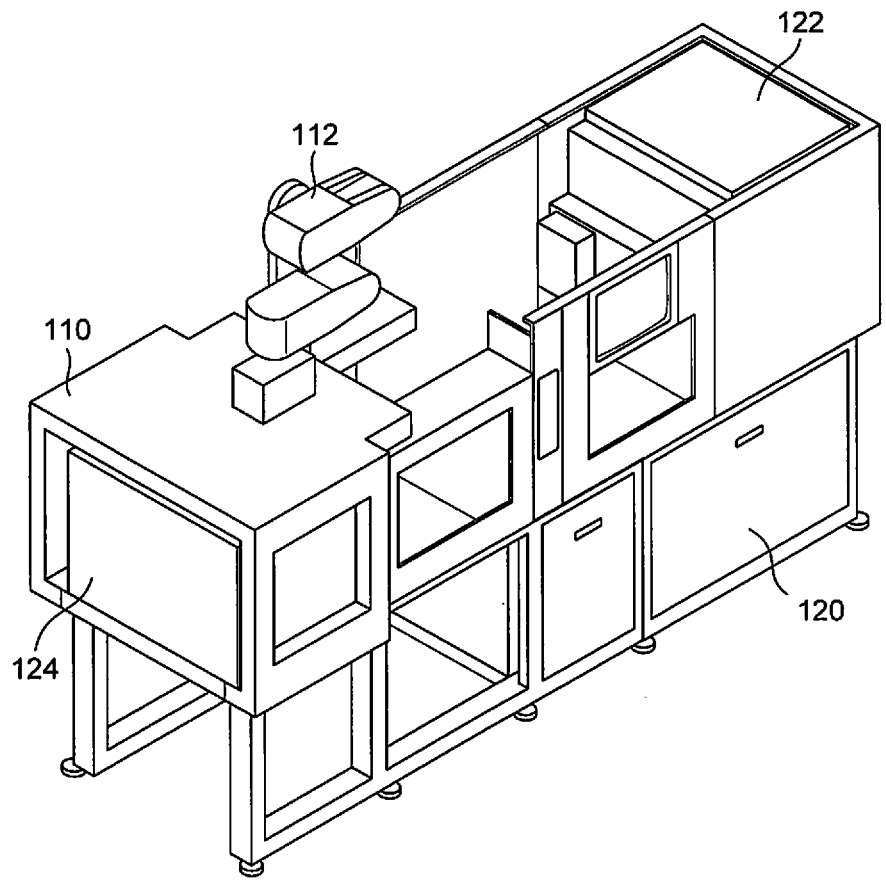
FIG. 1 is a diagram showing an appearance of a conventional injection molding system.

FIG. 1 is a diagram showing an appearance of a conventional injection molding system. The injection molding machine mainly includes an injection device 122, a clamping device 124, and a machine stool 120. The injection device 122 and the clamping device 124 are placed on the machine stool 120. A rack 110 is provided like surrounding the clamping device 124 and the rack 110 is fixed to the machine stool 120. A molded product extraction device 112 is fixed onto the rack 110 and has a function to extract a molded product molded by the injection device 122 and the clamping device 124 from the mold. A conventional procedure, which is publicly known, can be used to mold a molded product using the injection device 122 and the clamping device 124 in the injection molding machine and thus, the description thereof is omitted.

Figure 2:
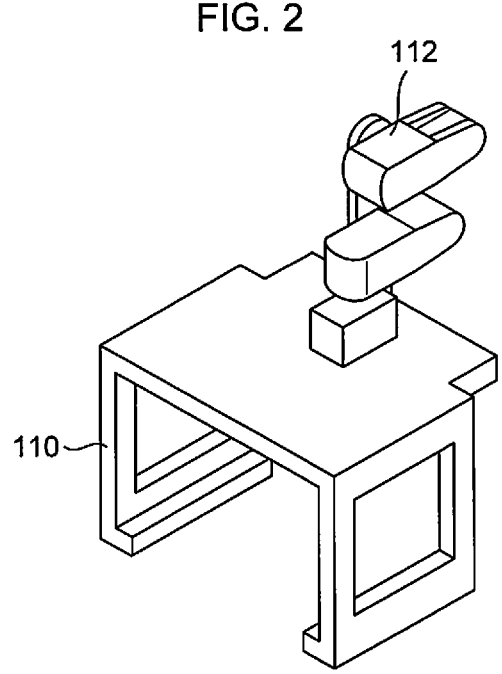
FIG. 2 is a diagram showing a rack and a molded product extraction device in FIG. 1 by extracting therefrom.

FIG. 2 is a diagram showing the rack 110 and the molded product extraction device 112 in FIG. 1 by extracting therefrom. The rack 110 has a portal shape in a direction opposite to a clamping direction of the clamping device 124 when mounted on the injection molding machine and a lower portion thereof can be fixed to the machine stool 120 by a fixing unit 111. Bolts or the like are used as the fixing unit 111. The molded product extraction device 112 is constructed of a robot and a molded product after being molded can be extracted from inside the mold of the injection molding machine by a hand attached to the tip portion of the robot being moved for gripping.

Figure 3:
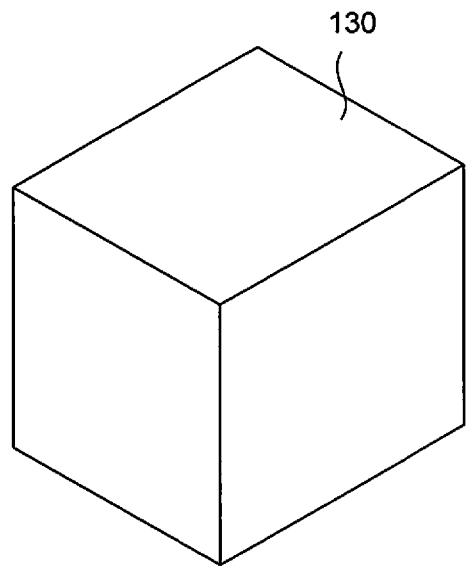
FIG. 3 is a diagram showing a conventional safety fence surrounding a molded product extraction device.
Figure 4:
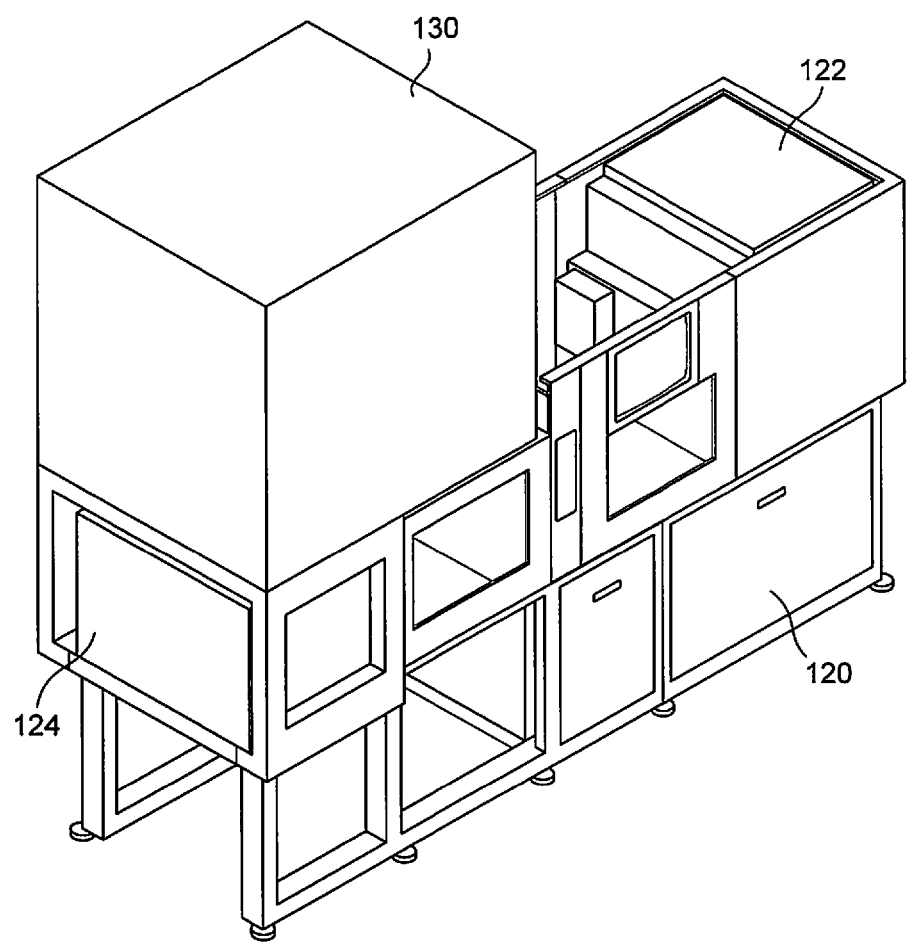
FIG. 4 is a diagram showing a state in which the conventional safety fence is mounted around the molded product extraction device.

FIG. 3 is a diagram showing a safety fence 130 surrounding the molded product extraction device 112. The injection molding machine vibrates frequently because the motor moves or a large force is frequently added to the injection molding machine and the box shape as shown in FIG. 3 is adopted for the safety fence 130 in most cases. FIG. 4 shows a state in which the safety fence 130 shown in FIG. 3 is mounted around the molded product extraction device 112. The safety fence 130 is constructed such that the entire construction is placed on the clamping device 124. In the conventional example, the safety fence 130 is provided above the clamping device 124 placed on the machine stool 120 and thus, it may be difficult to mount the safety fence 130 and when the mechanism unit of the injection molding machine is maintained, the maintenance may be hindered by the safety fence 130.

Figure 5:
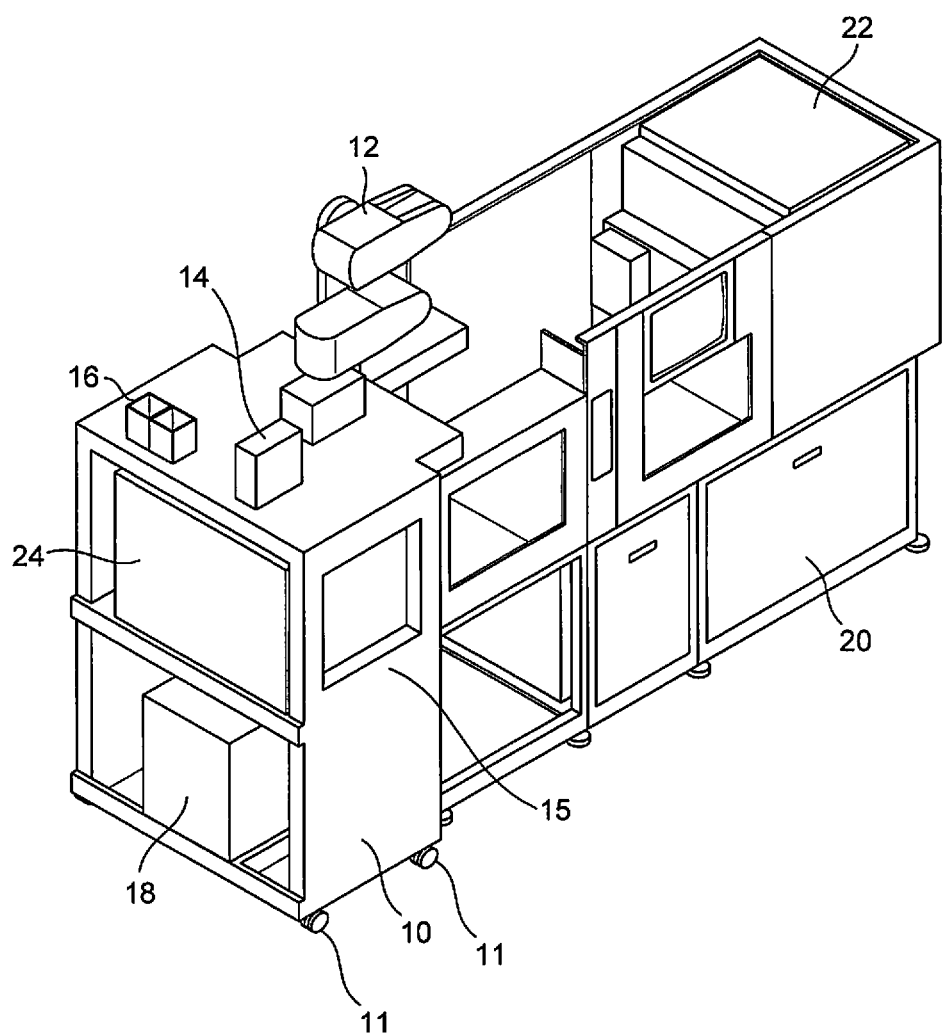
FIG. 5 is a diagram showing the appearance of an injection molding system according to an embodiment of the present invention.

In view of the above problems, an embodiment of the present invention will be described below based on drawings. FIG. 5 is a diagram showing the appearance of an injection molding system according to the present embodiment and FIG. 6 is a diagram showing a rack 10 by extracting from FIG. 5.

The injection molding machine mainly includes an injection device 22, a clamping device 24, and a machine stool 20 and the injection device 22 and the clamping device 24 are placed on the machine stool 20. A molded product extraction device 12, a static eliminator 14, and a molded product containing box 16 are provided on the top surface of the rack 10. In the lower row of the rack 10, a molded product extraction control device 18 to control the molded product extraction device 12 is provided. Further, a roller 11 is provided in the lowest portion of the rack 10 so that the rack 10 alone is movable. Instead of the roller 11, wheels or the like may be used as a mechanism to move the rack 10. The molded product extraction device 12 may be constructed of a robot or a common extraction device.

The rack 10 is provided with an opening on the side opposite to the machine stool 20 of the injection molding machine. By moving the rack 10 appropriately, the opening can be positioned such that the clamping device 24 of the injection molding machine goes into the rack 10 therethrough. Also on the side opposite to the machine stool 20 of the injection molding machine of the rack 10, a mounting position 15 where the rack 10 and the machine stool 20 are fixed is provided and side face portions of the rack 10 and the machine stool 20 are fixed by a fixing member 13. When compared with a conventional example, the rack can be fixed to the side face portion of the machine stool 20 at an appropriate height by the fixing member, which facilitates the fixing work.

Figure 6:
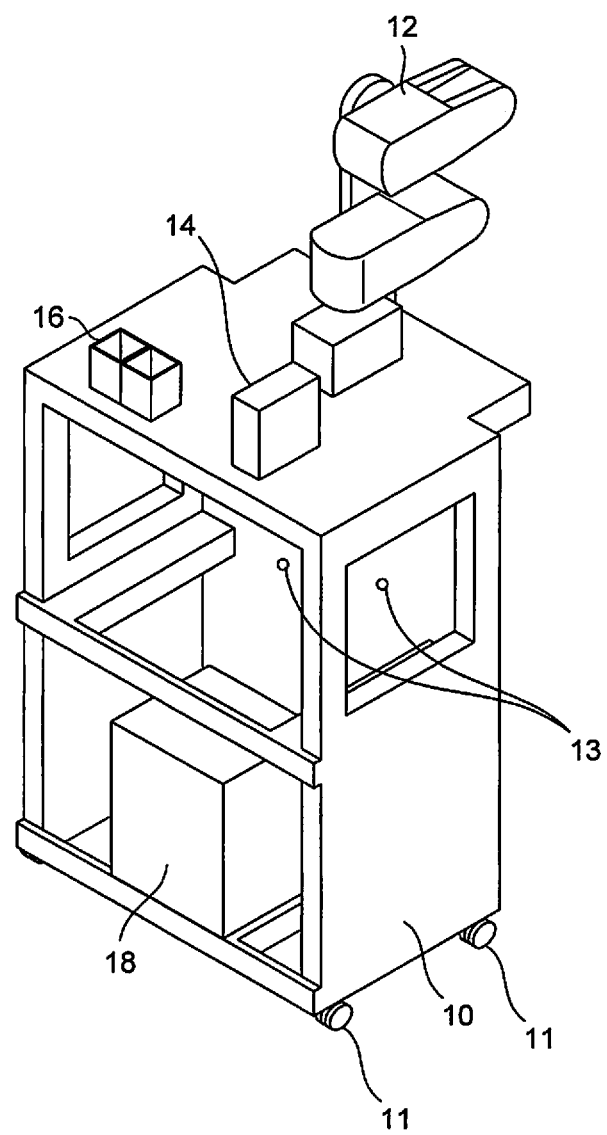
FIG. 6 is a diagram showing a rack and a molded product extraction device in FIG. 5 by extracting therefrom.
Figure 7:
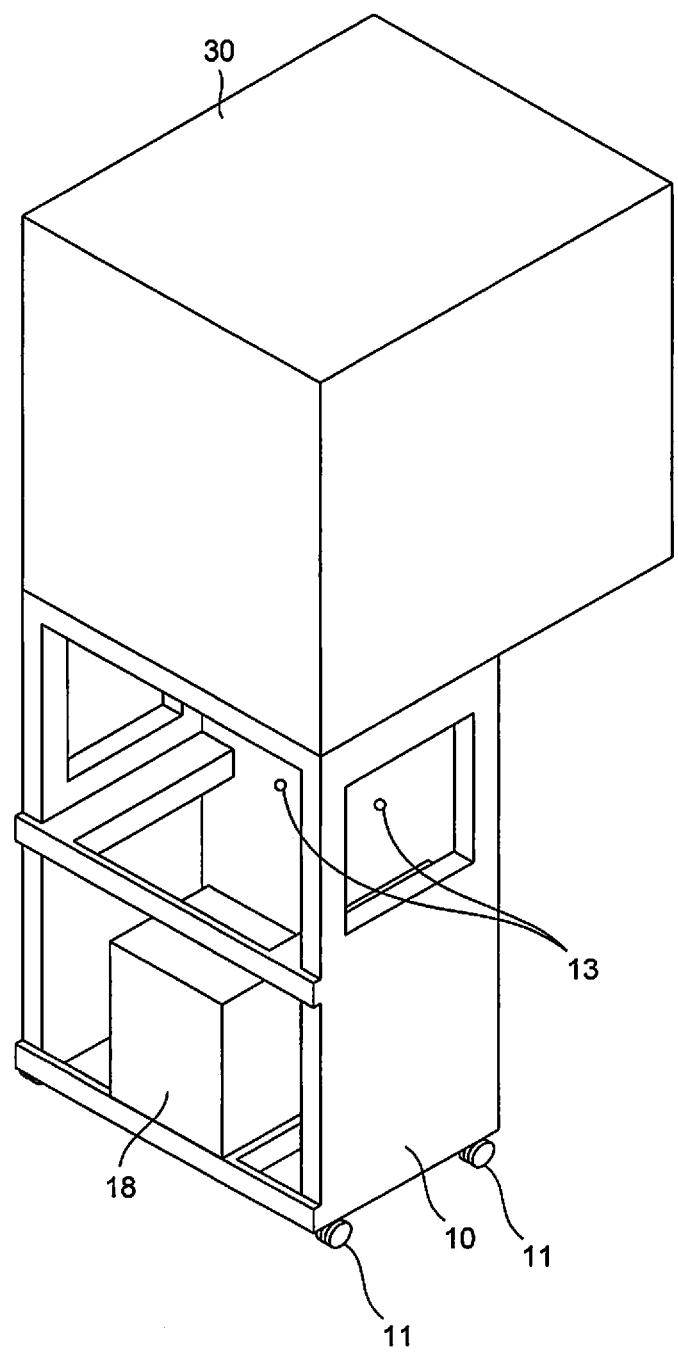
FIG. 7 is a diagram showing a state in which the safety fence is provided for the rack in FIG. 6.
Figure 8:
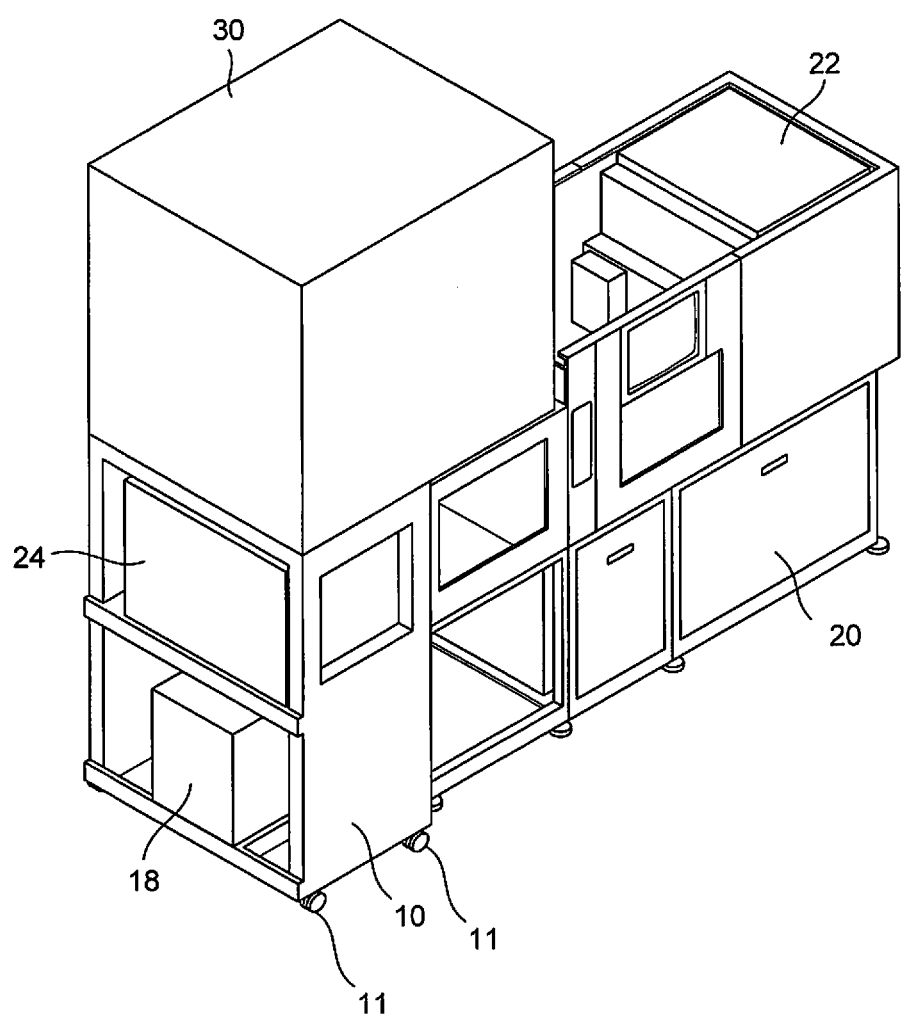
FIG. 8 is a diagram showing a state in which the rack is fixed to a machine stool of an injection molding machine while a safety fence is provided.
Figure 9:
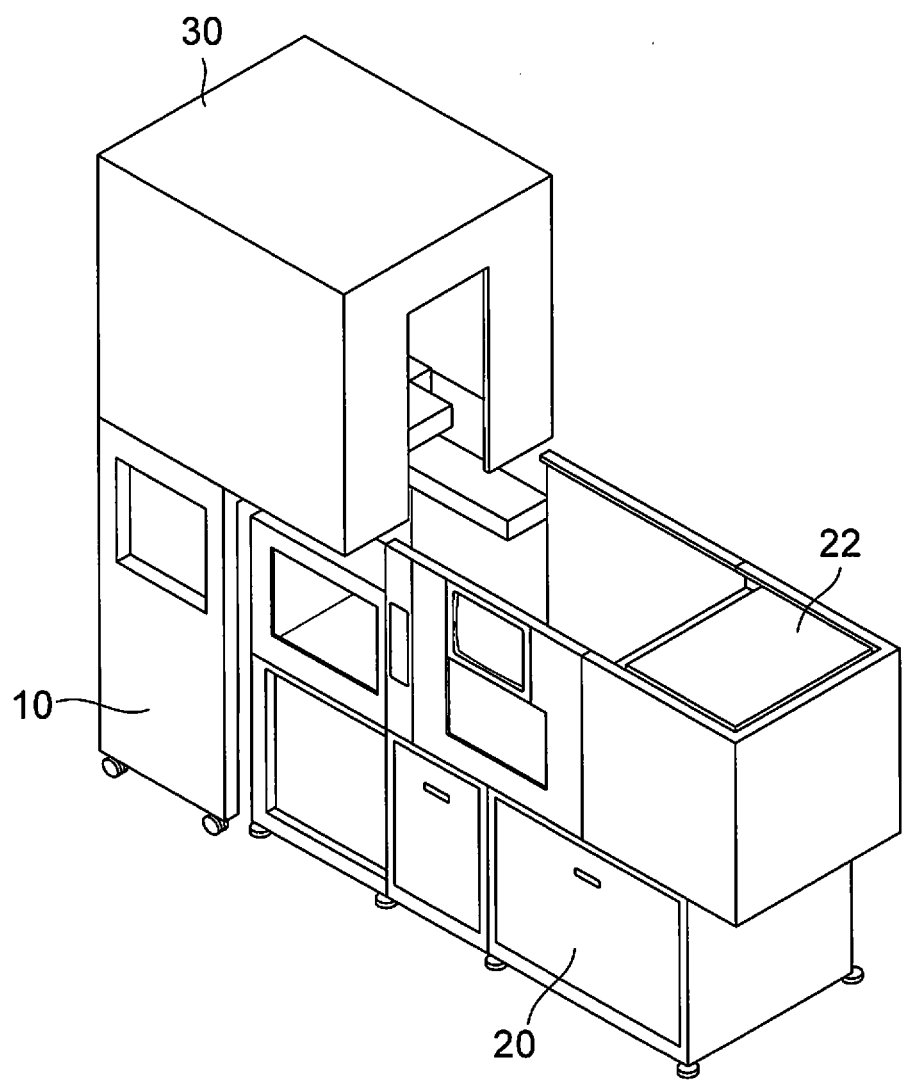
FIG. 9 is a diagram showing a state in which the rack is fixed to the machine stool of the injection molding machine while the safety fence is provided.

FIG. 7 is a diagram showing a state in which a safety fence 30 is provided on the rack 10 in FIG. 6. FIGS. 8 and 9 are diagrams showing a state in which the rack 10 is fixed to the machine stool 20 of the injection molding machine while the safety fence 30 is provided. As shown in FIG. 7, even if the safety fence 30 is provided on the rack 10, the rack 10 can run autonomously. In a state in which combined with the injection molding machine, as shown in FIGS. 8 and 9, the molded product extraction device 12 is covered with the safety fence 30 above the clamping device 24 of the injection molding machine. With the molded product extraction device 12 and the like configured to be arranged above the clamping device 24 of the injection molding machine, in contrast to an injection device provided with a hopper or the like, the space above the clamping device 24, which is normally a dead space, can effectively be used.

Figure 10:
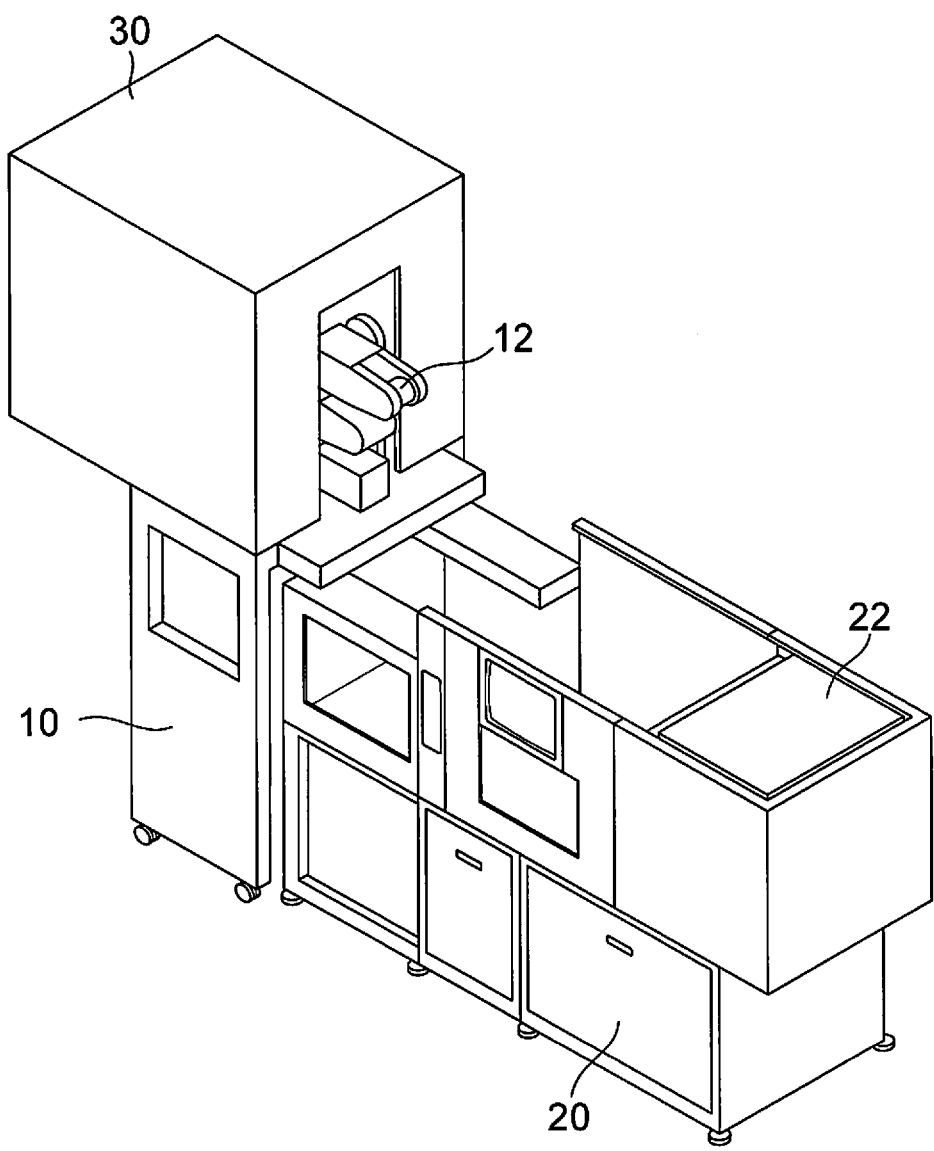
FIG. 10 is a diagram showing a state in which the safety fence is slid from the state in FIG. 9.

As shown in FIG. 9, the safety fence 30 is provided with an opening on the side opposite to the injection molding machine. In addition, rails (not shown) are provided in the left and right direction on a top surface portion of the rack 10 and rollers (not shown) meshing with the rails are provided below the safety fence 30 so that a slide mechanism is constructed of the rails and rollers. Accordingly, the safety fence 30 is configured to be able to slide in a direction opposite to the injection molding machine. Accordingly, as shown in FIG. 10, the molded product extraction device 12 can be exposed to the outside from inside the safety fence 30 by sliding the safety fence 30. Therefore, maintenance of each mechanism such as performing maintenance of a molded product by exposing the molded product extraction device 12 to the outside and replacing the mold of the injection molding machine by moving the position of the safety fence 30 can easily be performed.

The invention claimed is:

1. An injection molding system, comprising:
   an injection molding machine having a machine stool;
   a peripheral device; and
   a rack on which the peripheral device is to be mounted, wherein
   the rack includes
      a fixing unit for removably fixing the rack to the machine stool, and
      a moving unit for making the rack movable autonomously with respect to the machine stool.

2. The injection molding system according to claim 1, wherein the moving unit is a roller or a wheel.

3. The injection molding system according to claim 1, wherein a mounting surface of the rack for the peripheral device is above a clamping mechanism unit of the injection molding machine.

4. The injection molding system according to claim 1, wherein the fixing unit is included on a side face on a clamping unit side of the machine stool.

5. The injection molding system according to claim 1, wherein the peripheral device includes a safety fence provided on the rack.

6. The injection molding system according to claim 1, further comprising
   a molded product extraction device provided on a top surface of the rack, and
   a molded product extraction control device provided in a lower row of the rack, the molded product extraction control device being configured to control the molded product extraction device.

7. The injection molding system according to claim 1, wherein the rack includes an opening provided on a side opposite to the machine stool of the injection molding machine.

8. An injection molding system, comprising:
   an injection molding machine having a machine stool;
   a peripheral device; and
   a rack on which the peripheral device can be mounted, wherein
   the rack includes
      a fixing unit for removably fixing to the machine stool and
      a moving unit for making the rack movable alone,
   wherein the peripheral device is a molded product extraction device and a safety fence of the molded product extraction device is provided on the rack.

9. The injection molding system according to claim 8, wherein the molded product extraction device is a robot.

10. The injection molding system according to claim 8, further comprising a slide mechanism that allows the safety fence to move.

* * * * *